Sept. 14, 1937. M. R. CLINE 2,093,307
EQUAL CUT PIEPAN
Filed April 15, 1936
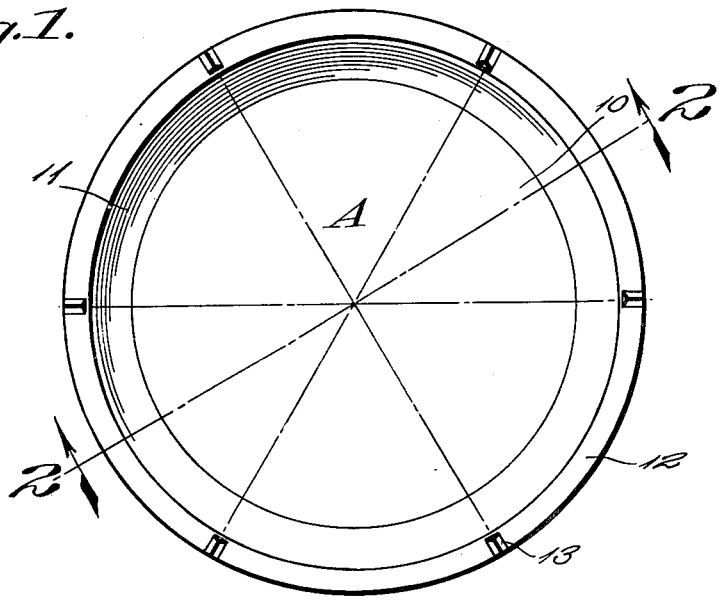
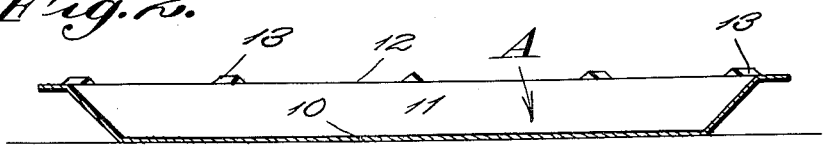
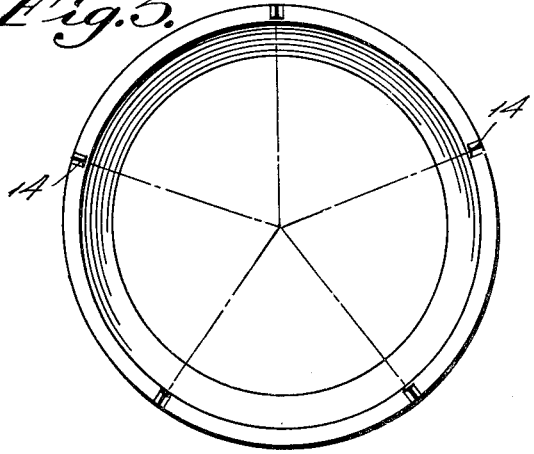
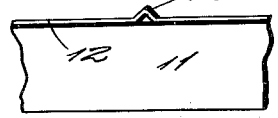
Milton Roth Cline
INVENTOR
BY Victor J. Evans & Co.
ATTORNEYS
WITNESS Patented Sept. 14, 1937

2,093,307

UNITED STATES PATENT OFFICE 2,093,307

EQUAL CUT PIEPAN

Milton Roth Cline, Culver, Ind.

Application April 15, 1936, Serial No. 74,539

1 Claim. (Cl. 53—6)

The invention relates to a pie plate or tin and more especially to an equal cut pie pan.

The primary object of the invention is the provision of a pan of this character, wherein the peripheral circular edge thereof has struck upwardly therefrom markers so that a pie held within the pan can be cut into equal segments after such pie has been removed from the pan in that the markers identify the place for the cutting of the respective sectors of such pie into equal portions thus materially aiding in the servicing of such pie.

Another object of the invention is the provision of a pan of this character, wherein when a number of these are not in use they can be placed one within the other and there is no liability of such pans sticking to each other and rendering it difficult to separate the pans for use in that the upwardly struck portions at the peripheries or the circular edges of such pans hold the same in spaced relation when nested one within the other.

A further object of the invention is the provision of a pan of this character, wherein the same has division markers thereon, functioning as guides for the cutting of the pie into equal portions.

A still further object of the invention is the provision of a pan of this character, wherein the markers thereof are presented boldly at the periphery of the pan so as to positively mark a pie when baked within the same so that the said pie can be cut into equal portions when serving.

A still further object of the invention is the provision of a pan of this character, which is simple in construction, thoroughly reliable and effective in its operation, and inexpensive to manufacture.

With these and other objects in view, the invention consists in the features of canstruction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a top plan view of a pan constructed in accordance with the invention.

Figure 2 is a sectional view on the line 2—2 of Figure 1 looking in the direction of the arrows.

Figure 3 is a fragmentary edge elevation.

Figure 4 is an enlarged fragmentary vertical sectional view through one of the markers as created in the pan.

Figure 5 is a view similar to Figure 1 showing a slight modification.

Similar reference characters indicate corresponding parts throughout the several views in the drawing.

Referring to the drawing in detail, A designates generally a pie pan, the same may be made from any suitable material preferably tin and as usual is of circular form having a depressed circular center portion 10 with a downwardly convergent side wall 11 about which is concentrically disposed the straight rim or peripheral flange 12. This construction of the pan thus far set forth is standard.

Struck upwardly from the rim or flange 12 are radially disposed inverted substantially V-shaped nibs or lugs 13, these being arranged equidistances from each other. In this arrangement of the nibs or lugs 13, they will be diametrically opposite one another throughout the periphery of the rim or flange 12 and are for the purpose of marking a pie content of the pan so that the said pie may be conveniently cut into equal portions or segments. Each nib or lug 13 extends through the outer edge of the rim or flange 12 and is directed inwardly to a point therefrom approaching the wall 11 by terminating short thereof.

In Figure 5 of the drawing the nibs or lugs 14 are equally distanced from each other and are five in number so that the pie can be marked for the cutting thereof into five equal portions or segments while in Figure 1 of the drawing the nibs or lugs 13 are six in number. Thus it can be recognized that the pie can be cut into equal portions of different sizes according to the lay of the nibs or lugs as struck upwardly from the pan.

These nibs or lugs when the pans are not in use and nested one within the other, that is by one fitting into the other, they will be prevented from sticking to each other and thus permitting the easy removal or separation of the pans for use.

In serving pieces of pie a person through the instrumentality of a knife starts to cut from one of the nib or lug indications as created in the pie at the periphery thereof in a straight path toward and to another nib or lug indication diametrically opposite and in this fashion under the successive steps of cutting the pie will be severed into equal portions or sectors so that during the serving no one person will have a larger piece or cut of pie than another.

What is claimed is:

A pan having a peripheral circular flange, and a series of inverted substantially V-shaped lugs struck upwardly from the flange and equally distanced from each other for creating marking points on a pie when baked in such article, the lugs being longitudinally extended substantially entirely across said flange and radially disposed with respect to the center of said article.

MILTON ROTH CLINE.